United States Patent [19]

Kimura et al.

[11] Patent Number: 5,948,525
[45] Date of Patent: Sep. 7, 1999

[54] BIAXIALLY STRETCHED POLYESTER FILM FOR FORMING CONTAINER AND METHOD OF PRODUCING THE FILM

[75] Inventors: Masahiro Kimura; Kohzo Takahashi, both of Shiga; Hiroji Kojima, Osaka; Koichi Abe, Kyoto, all of Japan

[73] Assignee: Toray Industries, Inc., Japan

[21] Appl. No.: 08/983,054

[22] PCT Filed: May 15, 1997

[86] PCT No.: PCT/JP97/01630

§ 371 Date: Jan. 26, 1998

§ 102(e) Date: Jan. 26, 1998

[87] PCT Pub. No.: WO97/43332

PCT Pub. Date: Nov. 20, 1997

[30] Foreign Application Priority Data

| May 16, 1996 | [JP] | Japan | 8-121519 |
| Aug. 29, 1996 | [JP] | Japan | 8-229018 |
| Feb. 5, 1997 | [JP] | Japan | 9-022489 |

[51] Int. Cl.$^6$ .............. B32B 7/12; C08F 20/00; C08G 63/02
[52] U.S. Cl. .......... 428/339; 528/275; 528/298; 528/302; 528/308; 528/308.6; 528/502; 525/444; 524/731; 428/35.7; 428/333; 428/338

[58] Field of Search .................. 528/275, 298, 528/302, 308, 308.6, 502; 525/444; 524/731; 428/35.7, 333, 338, 339

[56] References Cited

U.S. PATENT DOCUMENTS

| 3,683,060 | 8/1972 | Tanabe et al. | 264/289 |
| 5,106,681 | 4/1992 | Endo et al. | 428/323 |
| 5,337,174 | 8/1994 | Wada et al. | 359/73 |
| 5,698,309 | 12/1997 | Dallmann et al. | 428/323 |
| 5,783,120 | 7/1998 | Ouderkirk et al. | 264/1.34 |

*Primary Examiner*—Samuel A. Acquah
*Attorney, Agent, or Firm*—Austin R. Miller

[57] ABSTRACT

A biaxially stretched polyester film for forming a container, characterized by being formed of a polyester substantially consisting of an ethylene terephthalate unit and an ethylene naphthalate unit, the refractive index in the direction of thickness of the film being 1.5 or greater. This film is not only excellent in the formability during formation into cans or the like, but has excellent properties in taste property, particularly, the taste property after the retorting, and may be suitably used for containers produced by forming process and, particularly, for metallic cans.

21 Claims, No Drawings

BIAXIALLY STRETCHED POLYESTER FILM FOR FORMING CONTAINER AND METHOD OF PRODUCING THE FILM

TECHNICAL FIELD

The present invention relates to a biaxially stretched polyester film for forming containers. More particularly, it relates to a biaxially stretched polyester film that is excellent in formability, impact resistance and taste property and that is suitable for containers and, especially, metallic cans, to be produced by a forming process.

BACKGROUND ART

It has been widely practiced, for the purpose of preventing corrosion, to coat the internal surface and external surface of a metallic can with a material obtained by dissolving or dispersing in a solvent a thermosetting resin of various types, such as epoxy-based resin, phenol-based resin or the like, and thereby cover the metal surfaces. However, such a method of covering with a thermosetting resin has unfavorable problems such as the time consuming process of drying the coating material, a reduction in productivity, environmental pollution due to a large amount of the organic solvent, and the like.

As a method for solving these problems, there is a method that laminates a film on a material of a metallic can, that is, a steel sheet or an aluminum sheet, or one of these metallic sheets that has been surface-treated in a manner such as plating or the like. If a film-laminated metallic sheet is drawn or ironed to produce metallic cans, the film is required to have the following properties:

(1) The film should be excellent in adhesion to a metallic sheet.
(2) The film should be excellent in formability and does not cause a defect such as a pinhole after the forming process.
(3) The film should not be peeled, cracked or pinholed by impact on the metallic can.
(4) The polyester film should not adsorb a flavor component of the content of the metallic can or should cause degradation of the flavor of the content of the metallic by a substance dissolved from the film (hereinafter, referred to as "taste property").

Many proposals have been made to meet these requirements. For example, Japanese patent application laid-open No. Sho 64-22530 discloses a polyester film having specific density and face orientation coefficient; Japanese patent application laid-open No. Hei 2-57339 discloses a copolymerized polyester Film having specific crystallinity; and Japanese patent application laid-open No. Hei No. 6-218895, Japanese patent application laid-open No. Hei 6-107815, etc., disclose a polyester film coplymerized with an isophthalic acid component containing specific particles, or the like. However, these proposals cannot satisfy all the various requirements as stated above, and cannot be said to be at sufficiently satisfying levels especially in applications where both a high level formability and an excellent taste property after retorting are required.

An object of the present invention is to solve the aforementioned problems of the conventional art and to provide a biaxially stretched polyester film for forming containers that is excellent in formability, heat resistance and taste property and, more particularly, that is suitable for metallic cans produced by a forming process and having an excellent taste property.

DISCLOSURE OF THE INVENTION

The present invention is a result of finding that a polyester film obtained by copolymerizing or blending an ethylene terephthalate unit and an ethylene naphthalate unit and controlling the film structure at a high level is a film that is not only excellent in laminate characteristics but also excellent in the formability during high speed forming and good in taste property especially after retorting.

BEST MODE FOR CARRYING OUT THE INVENTION

The biaxially stretched polyester film for forming containers of the present invention is a film which is formed from a polyester substantially consisting of an ethylene terephthalate unit and an ethylene naphthalate unit and whose refractive index in the direction of thickness of the film is 1.5 or greater.

The "polyester substantially consisting of an ethylene terephthalate unit and ethylene naphthalate unit" herein means a polyester that contains substantially no repetition unit, especially, ethylene isophthalate unit, other than the ethylene terephthalate and the ethylene naphthalate unit.

That is, the use of a polyester that contains substantially no isophthalic acid component is a feature of the present invention. The polyester composition of a film (hereinafter, referred to as "A-layer") formed from a polyester whose main constituting components are ethylene terephthalate and ethylene naphthalate (the sum of them is 95% or greater by weight and, more preferably, 97% or greater by weight) is preferably a polyester wherein 50–99% by weight of the polyester constituting components is an ethylene terephthalate unit and 1–50% by weight is ethylene naphthalate unit, in view of good taste property after retorting and good formability in the can producing process, and, more preferably, a polyester wherein 5–30% by weight is ethylene naphthalate unit and 70–95% by weight is an ethylene terephthalate unit, in view of formability. As for a method of producing a polyester whose main constituting components are ethylene terephthalate and ethylene naphthalate, it is possible to produce it by copolymerization or produce it by polymerizing polyethylene terephthalate and polyethylene naphthalate separately and chip-blending them by using a kneading machine or the like. However, in view of the handling characteristics of the resultant polymer, the heat property, and the like, a method that chip-blends by using a kneading machine is preferred.

Specifically, the kneading temperature is preferably the melting point +30° C. or lower and, more preferably, the melting point +25° C. or lower. The kneading in a high vacuum condition is particularly preferable because the thermal decomposition is restricted. The kneading time is preferably one hour or less for the restriction of thermal decomposition. The kneading machine may be either a double screw type or a single screw type. However, it is preferred to use a double screw kneading machine in view of uniformity of the polymer.

As for the heat property of such a polymer, it is preferable that there be only a single crystal melting peak in view of formability and laminate characteristics.

Furthermore, it is possible to copolymerize another dicarboxylic acid component or glycol component as long as the taste property is not degraded. The dicarboxylic acid component may be, for example, aromatic dicarboxylic acids such as diphenydicarboxylic acid, diphenyl sulfone dicarboxylic acid, diphenoxyethane carboxylic acid, 5-sodium sulfoisophthalic acid, phthalic acid, isophthalic acid or the like, aliphatic dicarboxylic acids such as oxalic acid, succinic acid, adipic acid, sebacic acid, dimer acid, maleic acid, fumaric acid and the like, alicyclic dicarboxylic acids such as cyclohexine dicarboxylic acid and the like, oxycarboxylic acids such as p-oxybenzoic acid and the like, etc. On the other hand, the glycol component may be, for example, aliphatic glycols such as propanediol, butanediol, pentanediol, hexanediol, neopentyl glycol and the like, alicyclic glycols such as cyclohexane dimethanol and the like, aromatic glycols such as bisphenol A, bisphenol S and the like, diethylene glycol, polyethylene glycol, etc. Two or more species of the dicarboxylic components and the glycol components may be used together.

The components contained in small amounts in the polyester according to the present invention may be diethylene glycol, polyethylene glycol, cyclohexane dimethanol, sebacic acid, dimer acid and the like. For applications where the taste property is severe, diethylene glycol, polyethylene glycol and the like may be cited as examples.

The refractive index in the direction of thickness of the A-layer needs to be 1.5 or greater in view of drawing formability and laminate characteristics. The refractive index is normally within the range of 1.5–1.6 and, preferably, within the range of 1.51–1.6. A refractive index of 1.52 or greater is particularly preferable because such a refractive index makes it possible to control the face orientation coefficient within a specific range for achieving both good formability and good impact resistance even if temperature varies to some extents during laminating.

As for the polyester according to the present invention, it is preferable that the melting point (melting peak temperature) by DSC be 240–300° C. in view of good laminate characteristics and good taste property for retorting. A more preferred range is 245–300° C., and a particularly preferred range is 246–300° C. Furthermore, in view of formability and laminate characteristics, one of the DSC peaks is preferably 220° C. or lower and, more preferably, 200° C. The DSC peaks herein are endothermic peaks arising from the heat treating conditions for the film, which were determined during measurement of the film using a differential scanning calorimeter (DSC-2 Model by Parkin Elmer (phonetically translated)) at a temperature increasing rate of 16° C./min. The DSC peak differs from the intrinsic crystal melting peak of polyester.

Furthermore, it is preferable according to the present invention that the amount of carboxyl terminal groups of the polyester be 10–50 equivalence/ton in view of good adhesion to metal and good taste property after retorting. Further, 15–48 equivalence/ton is more preferable and 15–45 equivalence-ton is particularly preferable because such an amount achieves excellent long-time storability of a beverage can.

According to the present invention, the polyester is biaxially stretched in order to improve heat resistance and taste property. The biaxially stretching method may be either simultaneous biaxial stretching or sequential biaxial stretching. However, it is preferred to specify the stretching conditions and heat treating conditions so that the refractive index in the direction of thickness of the film becomes within the aforementioned range, for improvement in laminate characteristics and drawing formability. Since a refractive index of 1.51 or greater, more preferably, 1.52 or greater, makes it possible to control the face orientation coefficient within a specific range for achieving both good formability and good impact resistance even if temperature varies to some extents during laminating, such a setting is preferable.

As for the biaxially stretched polyester film of the present invention, it is preferred that the relaxation time of a carbonyl portion by structural analysis using solid high resolution NMR be 270 msec or longer in view of an improvement in the workability during the working of a neck portion which is performed after the film has received thermal history of about 200–230° C. following the draw forming in a can producing process. The relaxation time is more preferably 280 msec or longer and, particularly preferably, 300 msec or longer. A predetermined magnitude of the relaxation time of the carbonyl portion can be achieved by optimizing the film producing conditions, the mixing ratio of ethylene naphthalate and ethylene terephthalate, and the transesterification characteristic of ethylene naphthalate and ethylene terephthalate.

Furthermore, according to the present invention, in view of the workability during the working of a neck portion, the thermal crystallization parameter $\Delta Tcg$ of the polyester (increasing temperature thermal crystallization temperature–glass transition temperature) is preferably at least 60° C. and at most 150° C. and, particularly preferably, at least 70° C. and at most 150° C. As for a method for providing such thermal crystallization characteristics, the characteristics can be achieved by controlling the catalyst, the molecular weight, the diethylene glycol content, controlling the mixing ratio of ethylene naphthalate and ethylene terephthalate, and the transesterification characteristic of ethylene naphthalate and ethylene terephthalate.

According to the present invention, the intrinsic viscosity of the polyester is preferably 0.5–1.5, more preferably 0.6–1.3, and particularly preferably 0.7–1.2, in view of formability, heat resistance and taste property.

To produce a polyester according to the present invention, conventionally known reaction catalysts and anti-coloring agents may be used together. The reaction catalyst may be, for example, an alkaline metal compound, an alkaline earth compound, a zinc compound, a lead compound, a manganese compound, a cobalt compound, an aluminium compound, an antimony compound, a titanium compound, and the like. The anti-coloring agent may be, for example, a phosphorus compound and the like. Preferably, it is preferred to add an antimony compound, a germanium compound or a titanium compound as a polymerization catalyst, normally in any desired step preceding the completion of production of the polyester. As examples of such a method using, for example, a germanium compound, a method wherein powder of a germanium compound is directly added, a method as described in Japanese patent publication No. Sho 54-22234, wherein a germanium compound is added by dissolving it in a glycol component, that is, a starting material of polyester, etc. may be cited. The germanium compound may be, for example, germanium dioxide, crystallization water-containing germanium hydroxide, or germanium alkoxides such as germanium tetramethoxide, germanium tetraethoxide, germanium tetrabutoxide, germanium ethylene glycoxide and the like, germanium phenoxide compounds such as germanium phenolate, germanium β-naphtholate and the like, phosphorus containing germanium compounds such as germanium phosphate, germanium phosphite and the like, germanium acetate, and the like. Preferred among these is germanium dioxide. Although the antimony compound is not particularly limited, antimony oxides, such as antimony trioxide, antimony acetate and the like, may be cited as examples. Although the titanium compound is not particularly limited, alkyl titanate compounds, such as tetraethyl titanate, tetrabutyl titanate and the like, may preferably be used.

Explanation will be made with reference to a case where a germanium dioxide is used as a germanium compound for production of, for example, a polyethylene terephthalate. A germanium element containing polymer is obtained by carrying out the transesterification or esterification reaction of terephthalic acid component and ethylene glycol, then adding germanium dioxide and a phosphorus compound, and subsequently carrying out the polycondensation at a high temperature and a reduced pressure until a predetermined diethylene glycol content is obtained. Preferably, the solid-state polymerization of the resultant polymer is carried out at a temperature equal to or lower than its melting point under a reduced pressure or an inert gas atmosphere, to reduce the acetaldehyde content, thereby obtaining predetermined intrinsic viscosity and carboxyl terminal groups. Such a method and the like may be cited as an example.

It is preferred that polyester according to the present invention have, preferably, a diethylene glycol component content of 0.1–5% by weight and, more preferably, 0.01–3% by weight and, particularly preferably, 0.01–2% by weight, in view of maintenance of good impact resistance despite reception of various thermal histories, such as heat treatment, the retorting after the can production during a can producing process. This indicates an improvement in the oxidative destruction resistance at 200° C. or higher. A known anti-oxidizing agent may also be added in an amount of 0.0001–1% by weight. Diethylene glycol may also be added during polymer production within a such range that no deterioration of the properties is caused.

Furthermore, for good taste property, it is preferred that the acetaldehyde content in the film be, preferably, 27 ppm and, more preferably, 23 ppm and, particularly preferably, 18 ppm. The method for reducing the acetaldehyde content in the film is not particularly limited. However, for example, to eliminate acetaldehyde produced by thermal decomposition during the production of a polyester by polycondensation and the like, a method in which the polyester is heat-treated at a temperature equal to or lower than the melting point of the polyester under a reduced pressure or an inert gas atmosphere, a method in which the solid-state polymerization of the polyester is carried out, preferably, at a temperature equal to or higher than 150° C. but lower than or equal to its melting point under a reduced pressure or an inert gas atmosphere, a method in which the melt extrusion is performed using a vent-type extruder, a method in which the melt extrusion of the polymer is performed at an extrusion temperature within the melting point of the high melting point polymer +30° C. and, preferably, within the melting point +25° C., for a shot time, preferably, with an average dwell time equal to or less than one hour, and the like may be cited as examples.

The biaxially stretched polyester film of the present invention may be used in the form of either a single layer or a laminate. The thickness of biaxially stretched polyester film of the present invention is preferably 3–50 μm and, more preferably, 8–30 μm in view of the formability after lamination on a metal, the metal coating characteristic, impact resistance and taste property. If the film of the invention is used in the form of a laminate, a polymer, such as a thermoplastic polymer, a thermosetting polymer and the like, may be laminated. A polyester, for example, a macromolecular polyethylene terephthalate, isophthalic acid copolymerized polyethylene terephthalate, a copolymerized polyethylene terephthalate having a butanediol, isophthalic residual skeleton, a polyester obtained by adding diethylene glycol and performing copolymerization, or the like, may be laminated. In view of taste property, the lamination of polyethylene naphthalate and/or polyethylene terephthalate obtained by adding and copolymerizing with a thermoplastic polymer, diethylene glycol, may be cited as an example.

The method of producing the biaxially stretched polyester film of the present invention, although not particularly limited, may be performed as in the following example. A polyester, after being dried if necessary, is supplied to a known melt extruder and extruded in the form of a sheet from a slit-shaped die, and closely contacting the extruded polyester with a casting drum by a method such as application of static electricity, and cooling it for solidification, thereby obtaining an unstretched sheet. The unstretched sheet is stretched in the directions of length and width of the film, and then heat-treated, thereby obtaining a film having a desired refractive index in the direction of width. Preferably, a film obtained by a tenter method is preferred in view of the quality of the film. A sequential biaxial stretching method in which the stretching in the direction of length is followed by the stretching in the direction of width, and a simultaneous biaxial stretching method in which the stretching is performed substantially simultaneously in tne direction of length and the direction of width are preferred. The stretch ratio in either direction is 1.5–4.0 times and, preferably, 1.8–3.5 times. Either one of the stretch ratios in the direction of length and the direction of width may be greater than the other, or they may be the same. It is preferred that the stretching rate be 1000%/min.–200000%/min. The stretching temperature may be any temperature if it is equal to or higher than the glass transition temperature of the polyester but lower than or equal to the glass transition temperature +80° C. A preferable temperature is equal to or higher than the glass transition temperature +20° C., but lower than or equal to the glass transition temperature +60° C. The heat treatment of the film following the biaxial stretching may be performed in any conventionally known method, such as heat treatment in an oven or a heated roll, or the like. The temperature of the heat treatment may be any temperature equal to or higher than 120° C. but lower than or equal to 250° C., and it is preferably 150° C.–240° C. The heat treating time may be any length, but it is preferably between 0.1 and 60 seconds and, more preferably, between 1 and 20 seconds. The heat treatment may also be performed while the film is being relaxed in the direction of length and/or the direction of width. Furthermore, re-stretching may be performed in each direction once or more and, after that, heat treatment may be performed.

A film that is excellent not only in laminate characteristics but also in the scrape resistance during high speed forming and, in particular, good in the taste property after the retorting can be obtained by containment of predetermined particles in the film of the present invention. The particles to be used for this purpose may be freely selected from known internal particles, and external particles such as inorganic particles and/or organic particles, etc. In view of, for example, the protrusion configuration, abrasion resistance, workability, taste property and the like in the form of a film, particles having a volume average particle diameter of 0.005–5.0 μm are normally used, and a volume average particle diameter of 0.01–5.0 μm is particularly preferable. In view of, for example, the protrusion configuration, abrasion resistance and the like in the form of a film, particles wherein the relative standard deviation indicated below is 0.5 or less are favorable, and the standard deviation is preferably 0.3 or less. The particle content is 0.005–10% by weight and, preferably, 0.01–10% by weight and, more preferably, 0.01–5% by weight. In particular, a film containing 0.01–3% by weight of internal particles, inorganic particles and/or organic particles having a volume average particle diameter of 0.1–5 μm is preferable as a film to be used on an internal surface of a can. As for a method of precipitating internal particles, a known technique may-be adopted. Techniques described in Japanese patent application laid-open No. Sho 48-61556, Japanese patent application laid-open No. Sho 51-12860, Japanese patent application laid-open No. Sho 53-41355, Japanese patent application laid-open No. Sho 54-90397 and the like may be cited as examples. Furthermore, it is possible to also use other particles described in Japanese patent application laid-open No. Sho 55-20496, Japanese patent application laid-open No. Sho 59-204617 and the like. Particles having an average particle size greater than 5 μm is not preferable because the use of such particles makes it likely to cause a defect in the film.

$$\sigma = (\Sigma(Di-D)^2/n)^{1/2}/D$$

$$D = \Sigma Di/n$$

where $\sigma$: relative standard deviation

D: number average particle diameter (μm)

Di: particle diameter (μm)

n: number of particles (number)

The particle length/breadth ratio is desirably 1.0–1.2 in view of, for example, the protrusion configuration, abrasion resistance and the like in the form of a film. The Mohs hardness is desirably less than 7 in view of, for example, the protrusion hardness, abrasion resistance and the like in the form of a film.

Specifically, the inorganic particles may be, for example, wet and dry silica, colloidal silica, aluminum silicate, titanium oxide, calcium carbonate, calcium phosphate, barium sulfate, alumina, mica, kaolin, clay and the like. Among such materials, inorganic particles wherein a functional group on the surface of a particle reacts with polyester to produce a metallic carboxylate salt are preferred. More specifically, inorganic particles wherein $10^{-5}$ mol or more is present relative to 1 g of the particles are preferred in view of affinity to polyester and abrasion resistance, and $2 \times 10^{-5}$ mol or more is more preferred. Particularly, in view of particle size distribution, particle configuration, surface reactivity, affinity to polyester, the protrusion configuration and protrusion strength in the form of a film, and the like, aluminum silicate particles having composition as shown in the following expressions are preferred.

$$0.9 \leq Si \leq 1.5$$

$$0.1 \leq Al \leq 0.8$$

$$0.1 \leq M \leq 0.8$$

$$0.8 \leq M/Al \leq 1.5$$

where

Si: number of moles of silicon atoms in 100 g of particles,

Al: number of moles of aluminum atoms in 100 g of particles,

M: number of moles of alkaline metal atoms in 100 g of particles.

More preferably, $$0.9 \leq Si \leq 1.3$$

$$0.2 \leq Al \leq 0.6$$

$$0.2 \leq M \leq 0.6$$

$$0.8 \leq M/Al \leq 1.2$$

It is also preferable that the particles be substantially amorphous in view of surface reactivity, affinity to polyester, and the protrusion strength in the form of a film.

It is also preferable that the volume average particle diameter Dw (μm) and the specific surface area S (m²/g) satisfy the relationship of $S \geq 3.5/Dw$ in view of affinity to polyester, surface reactivity, the protrusion configuration and surface roughness in the form of a film, and the like.

Furthermore, in view of the protrusion strength in the form of a film, it is preferable that the strength ($S_{10}$) at a deformation of 10% satisfy the relationship of $$5 \text{ kgf/mm}^2 \leq S_{10} \leq 40 \text{ kgf/mm}^2$$

and, more preferably, $$10 \text{ kgf/mm}^2 \leq S_{10} \leq 25 \text{ kgf/mm}^2$$

As for the organic particles, various organic macromolecular particles may be used. Regarding the kind of particles, particles of any composition may be used as long as at least portion of the particles is insoluble in polyester. As a material of such particles, various materials may be used, for example, polyimide, polyamide imide, polymethylmethacrylate, formaldehyde resin, phenol resin, crosslinked polystyrene, silicone resin and the like. However, vinyl based crosslinked macromolecular particles that have high heat resistance and are easy to form particles with uniform particle size distribution are particularly preferable.

The vinyl based crosslinked macromolecular particles are formed of a copolymer of a mono-vinyl compound (I) having only one aliphatic unsaturated bond in the molecule and a compound (II) having at least two aliphatic unsaturated bonds in the molecule.

As examples of the aforementioned compound (I) of the copolymer, mono-vinyl compounds such as styrene, α-methylstyrene, fluorostyrene, vinyl pilin, ethyl vinylbenzene and the like, vinyl cyanide compounds such as acrylonitrile, methacrylonitrile and the like, acrylic acid ester monomers such as methyl acrylate, ethyl acrylate, propyl acrylate, hexadecyl acrylate, octyl acrylate, dodecyl acrylate, glycidyl acrylate, N,N'-dimethylaminoethyl acrylate and the like, methacrylic acid ester monomers such as methyl methacrylate, ethyl methacrylate, propyl methacrylate, isopropyl methacrylate, butyl methacrylate, sec-butyl methacrylate, acryl methacrylate, phenyl methacrylate, benzyl methacrylate, 2-ethyl methacrylate, 2-hydroxylethyl methacrylate, glycyl methacrylate, N,N-dimethylaminoethyl methacrylate and the like, acid anhydrides of mono or dicarboxylic acids such as acrylic acid, methacrylic acid, maleic acid, itaconic acid and the like, and amide-based monomers such as acrylamide, methacrylamide and the like, may be used.

As the aforementioned compound (I), styrene, ethyl vinylbenzene, methyl methacrylate and the like are preferably used in view of thermal stability, crosslinking characteristic, handling characteristic and the like.

As examples of the compound (II), divinylbenzene compounds, or polyacrylate and methacrylate, such as trimethylolpropane triacrylate, trimethylolpropane methacrylate, or ethylene glycol diacrylate, ethylene glycol dimethacrylate, polyethylene glycol diacrylate, polyethylene glycol dimethacrylate, 1,3-butylene diacrylate, 1,3-butylene dimethacrylate, or the like, may be cited.

Among the compounds (II), use of divinylbenzene, ethylene glycol dimethacrylate or trimethylolpropane triacrylate is particularly preferable in view of thermal stability, crosslinking characteristic and handling characteristic.

As examples of preferred composition of the vinyl-based crosslinked macromolecular particles, ethyl vinylbenzene-divinylbenzene copolymer, styrene-divinylbenzene copolymer, ethylene glycol dimethacrylate copolymer, styrene-ethylene glycol dimethacrylate copolymer, methyl methacrylatedivinylbenzene copolymer, and the like may be cited. However, the composition of the particles is not limited to these examples. For example, it may be copolymer series of three or more components, such as styrene-ethyl vinylbenzenedivinylbenzene copolymer, styrene-ethylene glycol dimethacrylate-methyl methacrylate copolymer and the like.

Such vinyl-based macromolecular particles may be produced by, for example, mixing the compounds (I) and (II) and employing a method such as emulsion polymerization as below.

(a) A soap free polymerization method, that is, a method in which polymerization is performed by using no emulsifying agent or a very small amount of an emulsifying agent.

(b) A seed method in which emulsion polymerization is performed by adding polymer particles into the polymerization system prior to the emulsion polymerization.

(d) A polymerization method using a Ugel stat or the like as indicated in Japanese patent application laid-open No. Sho 54-97582.

(e) A polymerization method as in method (d), wherein no lubrication assistant is used.

The organic macromolecular particles are preferably particles having a heat resistance that the thermal decomposition temperature (10% reduction temperature, in a nitrogen gas stream, a temperature increasing rate of 10° C./min.) by a tnermo-balance is 350° C. or higher, in that during the production of a polyester composition, the melt-forming or the recovery of formed articles for recycle, the particles are unlikely to aggregate so that the surface uniformity, abrasion resistance and the like of the film does not deteriorate. The thermal decomposition temperature is more preferably 360° C. or higher and, particularly preferably, 370° C. or higher. In such organic macromolecular particles, a crosslinking degree defined relative to the entire organic components constituting particles, as follows: crosslinking degree= weight of crosslinking component of material monomer/ total weight of crosslinking component×100 (%), is preferably 10% or greater because the particle dispersing characteristics in a polyester film becomes good. The crosslinking degree is more preferably 30% or greater and, particularly preferably, 55% or greater. In the organic crosslinking macromolecular particles, it is preferable that the strength ($S_{10}$) at 10% deformation of particles satisfy the relationship of $$0.5 \text{ kgf/mm}^2 \leq S_{10} \leq 15 \text{ kgf/mm}^2$$

in view of running stability, abrasion resistance, the strength of surface protrusions, dimensional stability and the like, and, more preferably, $$0.5 \text{ kgf/mm}^2 \leq S_{10} \leq 13 \text{ kgf/mm}^2$$

The inorganic particles and organic macromolecular particles may be used individually. However, it is preferable that two or more species be used together. By combining different particles differing in properties, such as particle size distribution, particle strength and the like, a more highly functional film can be obtained.

Other type particles, for example, indeterminate-form externally added particles or internally precipitating particles of various kinds, or various surface treating agents, may also be used as long as the advantages of the present invention are not hindered.

The film of the present invention may also contain an anti-oxidizing agent. The anti-oxidizing agent is contained preferably in an mount of 0.0001–1% by weight relative to polyester in view of the impact resistance after the film receives a thermal history of 200° C. or higher, and the impact resistance after the film receives treatment by pressurized steam of about 120° C. (retorting treatment).

The kind of anti-oxidizing agent is not particularly limited. However, known anti-oxidizing agents classified into, for example, a hindered phenol family, a hydrazine family, a phosphite family and the like, may be publicly used. In particular, pentaerythrityl-tetrakis-[3-(3,5-di-t-butyl-4-hydroxyphenyl)propionate], 3,5-di-t-butyl-4-hydroxybenzyl phosphonate-diethyl ester, 1,3,5-trimethyl-2,4,6-tris (3,5-di-t-butyl-4-hydroxybenzyl)benzene, tris(2,4-di-t-butylphenyl)phosphite, and the like may be suitably used.

For use on an internal surface of a can, the central line average roughness Ra is preferably 0.003–0.05 μm and, more preferably, 0.005–0.03 μm. Furthermore, the ratio Rt/Ra wherein Rt is the maximum roughness is 4–50, preferably 6–40 and, particularly preferably 8–20, whereby the high speed can production characteristics will improve.

Furthermore, it is preferred to improve adhesion by subjecting the film to a surface treatment such as corona discharge treatment and the like, for further improvements in properties. For such a treatment, the E value is 5–60 and, preferably, 10–50. The E value herein is determined as E value=W/(D·V) where W is treatment strength (W), D is treatment width (m), and V is film speed (m/minutes).

According to the present invention, the wetting tension of at least one side of the film is preferably 45 dyne/cm or greater in order to considerably improve the impact resistance of the can obtained by high speed lamination followed by can production. The wetting tension is more preferably 48 dyne/cm or greater and, particularly preferably, it is desired to be 50 dyne/cm or greater.

As for the polyester film laminated on the A-layer (hereinafter, referred to as "B-layer") according to the present invention, it is preferred that 95% by weight or more of the constituting components of the polyester be ethylene terephthalate, in view of a good taste property after the retorting and a good formability during the can production. Further, a content of 97% by weight or more is desirable because such a content maintains a good taste property even when a beverage is stored in the metallic can for a long time.

Other dicarboxylic acid components or glycol components may also be copolymerized within a range that the taste property is not degraded. As examples of the dicarboxylic acid component, aromatic dicarboxylic acids such as diphenyldicarboxylic acid, diphenylsulfondicarboxylic acid, diphenoxyethanedicarboxylic acid, 5-sodium sulfoisophthalic acid, phthalic acid, isophthalic acid and the like, aliphatic dicarboxylic acids such as oxalic acid, succinic acid, adipic acid, sebacic acid, dimer acid, maleic acid, fumaric acid and the like, alicyclic dicarboxylic acids such as cyclohexinedicarboxylic acid and the like, oxycarboxylic acids such as p-oxybenzoic acid and the like may be cited. As examples of the glycol component, aliphatic glycols such as propanediol, butanediol, pentanediol, hexanediol, neopentyl glycol, and the like, alicyclic glycols such as cyclohexanedimethanol and the like, aromatic glycols such as bisphenol A, bisphenol S and the like, diethylene glycol, polyethylene glycol, and the like may be cited. Two of more species of these dicarboxylic acid components and glycol components may be used together.

The metallic sheet according to the present invention, although not particularly limited, is preferably a metallic sheet formed of a basic material such as iron, aluminum or the like, in view of formability. If a metallic sheet formed basically from iron is used, it is possible to provide a surface of the metallic sheet with an inorganic oxide coating layer, a coating layer of conversion treatment represented by; for example, chromic acid treatment, phosphoric acid treatment, chromic acid-phosphoric acid treatment, electrolytic chromic acid treatment, chromate treatment, chrome chromate treatment and the like. Particularly preferred is 6.5–150 mg/M$^2$ of chrome hydrated oxide in terms of metallic chrome converted value, as chrome. Furthermore, it is also possible to provide a ductile metal plated layer of, for example, nickel, tin, zinc, aluminum, gunmetal, brass and the like. The amount of plating is preferably 0.0–15 mg/m$^2$ in the case of tin plating and 1.8–20 mg/m$^2$ in the case of nickel or aluminum.

The biaxially stretched polyester film for forming containers of the present invention may be suitably used for the internal surface covering of a two-piece metallic can produced by drawing or ironing. Furthermore, since it also has good metal adhesion and formability, it may preferably be used for covering a lid portion of a can.

Furthermore, as for the method of producing a polyester whose main components are polyethylene terephthalate and polyethylene naphthalate according to the present invention, either copolymerization or chip blending using a kneader or the like may be employed. However, chip blending is preferable in view of handling characteristics, thermal property and the like.

As for a specific method of chip blending, a method in which after polyethylene terephthalate and polyethylene naphthalate are separately vacuum-dried at 180° C. for 4 hours, 93 parts by weight of polyethylene terephthalate and 7 parts by weight of polyethylene naphthalate are homogeneously mixed, and the resultant mixed chip is formed into a film by melt extrusion at 280° C. with a polymer dwell time of 30 minutes using a single screw extrusion melt film producing machine, and the like may be cited as examples, although the method is not limited to these methods. In addition, as a method of mixing chips, a method that uses a feeder to perform simultaneous supply and the like may be cited. As a kneading method, a method that uses a double screw extrusion melt film producing machine, a method in which after a mixture chip is produced using a kneader, melt film production is performed, and the like may be cited.

The polyester film (A-layer) thus obtained is preferably has a single crystal melting peak in view of formability and laminate characteristics.

The biaxially stretched polyester film of the present invention may be used as either a single layer or a laminate. Furthermore, if lamination is performed, it is possible to laminate a polyester other than the A-layer and the B-layer. However, if the film is laminated on a metal, it is preferable that the B-layer be laminated on one of the outermost layers to form a laminate surface, in view of formability. In view of formability, impact resistance and the taste property after the restoring, it is preferable that the A-layer be laminated on the other outermost layer.

EXAMPLES

The present invention will be described in detail hereinafter with reference to examples. The properties were measured and evaluated by the following methods.

(1) Content of Diethylene Glycol Component in Polyester
NMR (13c-NMR spectrum) was used for measurement.
(2) Intrinsic Viscosity of Polyester
Polyester was dissolved in ortho-chlorophenol, and the viscosity was measured at 25° C.
(3) Amount of Carboxyl Terminal Groups of Polyester
Polyester was dissolved in o-creosol/chloroform (weight ratio of 7/3) under the conditions of 90–120° C., 20 minutes, and potentiometric titration was performed using alkali to determine the amount.
(4) Refractive Index in the Direction of Width of Film
The refractive index was measured by an Abbe refractometer using a sodium D ray (wavelength of 589 nm) as a light source.
(5) Melting Point of Polyester, Thermal Crystallization Parameters, DSC Peaks
The melting point and the thermal crystallization parameters were determined by drying and melting polyester and then rapidly cooling it, and measuring a glass transition temperature (Tg), increasing temperature crystallization peak temperature (Tc) and crystal melting peak temperature (Tm) at a temperature increasing rate of 16° C./min using a differential scanning calorimeter (D SC-2 Model by Parkin Elmer. The thermal crystallization parameter was determined as $\Delta Tcg = Tc - Tg$.

As for the DSC peaks, endothermic peaks arising from the heat treating conditions for the film, which were determined during the measurement of the film using a differential scanning calorimeter (DSC-2 Model by Parkin Elmer (phonetically translated)) at a temperature increasing rate of 16° C./min, were determined. The DSC peak differs from the intrinsic crystal melting peak of polyester.
(6) Content of Acetaldehyde in Film
Two grams of fine powder of the film was sampled and placed together with ion exchanged water in a pressure resistive container. After water extraction at 120° C. for 60 minutes, quantification was performed by high sensitive gas chromatography.
(7) Particle Ratio, Volume Average Particle Diameter, Number Average Particle Diameter, Relative Standard Deviation θ

Particles were compounded into polyester and then cut into very thin pieces of 0.2 μm in thickness. Then, at least 50 particles were observed and measured by transmission electron microscope.

The particle ratio was determined by determining the length/breadth of individual particles and averaging the values.

The calculation expressions for the relative standard deviation θ and the number average particle diameter are as follows.

$$\theta = (\Sigma(Di-D)^2/n)^{1/2}/D$$

$$D = \Sigma Di/n$$

where

θ: relative standard deviation

D: number average particle diameter (μm)

Di: particle diameter (μm)

n: number of particles (number)

Further, the volume average particle diameter was determined based on the volume of individual particles calculated by the area corresponding diameter of particles.
(8) Measurement of Metallic Carboxylate Salt
One hundred grams of polymer containing 1% by weight of particles was dissolved in 1 L of ortho-chlorophenol (OCP) at 100° C. Then, the polymer solution was subjected to a centrifugal separator to separate the particles. Then, the polymer depositing on the separated particles was centrifugally separated after the dissolving in 100 mL of orthochlorophenol (OCP) at 100° C. After this procedure was repeatedly performed three times, the remaining particles were thoroughly washed with acetone. The obtained particles were subjected to analysis by FT-IR using FTS60A/896 by Bio-Rad Digilab.

(9) Measurement of Particle Composition (Si, Al)

Analysis was performed by fluorescent light X-ray analysis (FLX).

(10) Measurement of Particle Composition (Alkali Metal)

Analysis was performed by atomic light absorption method.

(11) Measurement of Strength ($S_{10}$) of Particles

Using a micro-pressure tester (MCTM-201 Model) by Shimazu Seisakusho (Kabushiki Gaisha), amounts of deformation were measured while loads of 0–1 gf were applied at a loading rate of 0.0145 gf/s. This measurement was performed ten times. Based on the average of the loads P (kgf) at 10% deformation of particles, $S_{10}$ was calculated from the following expression:

$$S_{10}=2.8P/\pi d^2$$

where

P: average value of loads at 10% deformation of particles (kgf)

d: volume average particle diameter (mm)

(12) Measurement of Specific Surface Area

Measurement was performed according to B.E.T. method

(13) Measurement of Mohs Hardness

Measurement was performed in accordance with JIS standards.

(14) Refractive Index in the Direction of Width of Film

The refractive index was measured by an Abbe refractometer using a sodium D ray (wavelength of 589 nm) as a light source.

(15) Measurement of Thickness Irregularity of Film

Using a film of 2 mm in length, measurements were taken at 10 points at intervals of 20 cm. The thickness irregularity was determined from the following expressions:

$$X_{AVE}=X_{TOTAL}/n$$

$$T(\%)=|Xn-X_{AVE}|_{MAX}/X_{AVE}\times 100$$

where $X_{AVE}$=thickness average value (μm)

$X_{TOTAL}$=total of a number of thicknesses equal to the number of measurements n=number of measurements (10 times)

T=thickness irregularity (%)

$|Xn-X_{AVE}|_{MAX}$=maximum of absolute value of difference from average value (μm)

(16) Surface Roughness of Film (Central Line Average Roughness Ra, Maximum Roughness Rt)

Measurement was performed using a high precision thin film step difference measuring instrument ET-10 by Kosaka Kenkyusho. The conditions were as indicated below. The average of 20 measurements was determined as a value of surface roughness.

Probe needle tip radius: 0.5 μm

Probe needle load: 5 mg

Measurement length: 1 mm

L Cutoff value: 0.08 mm

The definition of Ra and Rt is shown in, for example, "Measurement and Evaluation Methods for Surface Roughness" by NARA Jiro (United Engineering Center, 1983)

(17) Relaxation Time T1ρ by Solid High Resolution NMR

As measurement devices for solid NMR, a spectrometer JNM-GX270 by Nippon Denshi, MAS Controller NM-GSH27MU, a solid amplifier by Nippon Denshi, a probe NM-GSH27T VT.W) by Nippon Denshi, were used. Measurement was performed by measuring T1ρ of $^{13}C$ nucleus (spin lattice relaxation in the spin coordinates)

The measurement was performed under a temperature of 24.5° C., a humidity of 50 RH %, a static magnetic field intensity of 6.34 T (tesla), with the resonance frequencies of $^1H$ and $^{13}C$ being 270.2 MHz and 67.94 MHz, respectively. A MAS (magic angle spin) method was employed in order to eliminate the effect of anisotropy of chemical shit. The spin speed was 3.5–3.7 kHz. The conditions of pulse series were a rocking magnetic field intensity of 62.5 kHz, a pulse width of 4 μsec, 90° for $^1H$. The contact time for CP (cross polarization) for transferring the polarization of $^1H$ to $^{13}C$ was 1.5 msec. As the retention time τ, 0.001, 0.5, 0.7, 1, 3, 7, 10, 20, 30, 40 and 50 msec were employed. The free induction decay (FID) of the magnetization vector of $^{13}C$ after the retention time τ was measured (During the FID measurement, high power decoupling was performed in order to eliminate the effect of dipole interaction of $^1H$. Integration of 512 times was performed in order to improve the S/N ratio.). The pulse repetition time was within the range of 5 sec-15 sec. Among the measurement data, the following analysis was performed regarding carbonyl carbon (164 ppm; internal standard silicone rubber, 1.56 ppm). The T1ρ value can normally be expressed by:

$$I(t)=\Sigma(Ai)\exp(-t/T1\rho i)$$

(Ai: proportion of component to T1ρi) and can be determined from the gradient of the semi-logarithmic plotting of peak intensities measured with respect to the individual retention times. In this measurement, analysis was performed in a two-component system (T1ρ1: amorphous component, T1ρ2: crystal component), and the value was determined by least squares method fitting using the following expression:

$$I(t)=fa1\cdot\exp(-t/T1\rho 1)+fa2\cdot\exp(-t/T1\rho 2)$$

fa1: proportion of component to T1ρ1 fa2: proportion of component to T1ρ2 fa1+fa2=1

(18) Formability a. Before Heat Treatment

A can was obtained by laminating the film on a TFS steel sheet (0.25 mm in thickness) heated to the melting point-20° C.-the melting point+50° C. at 60 m/min, and then cooling with warm water at 60° C., and then performing two-step forming using a drawing machine (final forming ratio (maximum thickness/minimum thickness)=2.0, formed within a forming possible temperature range at 80–100° C.). A 1% saline solution was placed into the obtained can, and a voltage of 6 V was applied to the can and the electrode in the saline solution to read the current value three seconds later. An average value of the measurements from ten cans was determined.

A class: less than 0.001 mA

B class: 0.001 mA or greater to less than 0.01 mA

C class: 0.01 mA or greater to less than 0.05 mA

D class: 0.05 mA or greater b. After Heat Treatment

After heat treatment of 210° C. and 30 seconds following the aforementioned lamination, the steel sheet was bulged from the non-laminated surface (the height of the bulged portion being 5 mm) using a spherical member of 2 cm in radius at 70° C., and then subjected to the retorting (treated with pressurized steam at 120° C. for 30 minutes). From the conditions of the laminate steel sheet, the following determination was made.

A class: substantially no change

B class: whitened but no problem

C class: small darkened portions observed

D class: broken film

(19) Scrape Resistance

After 20 cans were two-step formed by the aforementioned drawing machine, the cans were ranked as follows by the amount of white powder occurring on the forming surface of the drawing machine.

A class . . . no white powder occurrence

B class . . . small amounts of white powder occurrence

C class . . . fairly large amounts of white powder occurrence

D class . . . large amounts of white powder occurrence

(20) Impact Resistance

After actually formed cans were heat-treated at 200° C. for 30 seconds, the cans were filled with 350 g of water and then lidded. After being left at 350° C. for 72 hours, the cans were given an impact by dropping them from a height of 30 cm in such a manner that the bottom surface of each can would become 45° to the concrete ground at the landing. After the content was removed, the internal surface of each can was masked with wax and a 1% saline solution was placed in the cup. After stand for one day, a voltage of 6 V was applied to the can and the electrode in the saline solution to read the current value three seconds later. An average value of the measurements from ten cans was determined.

A class: less than 0.3 mA

B class: 0.3 mA or greater to less than 0.5 mA

C class: 0.5 mA or greater to less than 1.0 mA

D class: 1.0 mA or greater

(21) Taste Property

Cans (6 cm in diameter and 12 cm in height) were filled with water and then subjected to pressurized steam treatment of 120° C.×30 minutes. After stand at 40° C. for one month, the change in the liquid was evaluated by visual observation on the basis of the following references.

A class: no change in the liquid observed

B class: almost no change in the liquid observed

C class: slight change in the liquid observed

D class: change in the liquid observed

Example 1

After completion of transesterification using ethylene glycol, dimethyl terephthalate and dimethyl naphthalene-2,6-dicarboxylate as materials, and a germanium catalyst and phosphoric acid as a heat stabilizing agent, an ethylene glycol slurry containing aluminum silicate particles (volume average particle diameter of 0.2 $\mu$m, $S_{10}$ of 20 kgf/mm$^2$, specific surface area of 25 mm$^2$/g) was added, and residual ethylene glycol was discharged to the outside of the system. Subsequently, condensation polymerization was performed, thereby producing chips of polyethylene terephthalate copolymerized with 12 wt. % naphthalene dicarboxylic acid containing a predetermined amount of the particles (intrinsic viscosity of 0.70, 1.5% wt. % of diethylene glycol, melting point of 230° C., 30 equivalence/ton of carboxyl terminal groups, $\Delta Tcg=102°$ C.). After being crystallized at 100–120° C. by a high speed stirrer, the polyester was vacuum-dried at 150° C. for 4 hours and then supplied to a single screw extruder. After being melted at 275° C. and extruded from an ordinary nozzle, the extrusion was cooled and solidified on a mirror surface cooling drum while electrostatically charged, thereby obtaining an unstretched film. The unstretched film was stretched at 115° C. to 2.9 times lengthwise and, after being cooled to 30° C., stretched at 120° C. to 2.8 times widthwise, and then relaxed by 3% at 190° C. and heat-treated for 5 seconds. The resultant film properties and can properties were as shown in Table 1. Thus, excellent formability, scrape resistance, impact resistance and taste property were obtained.

Examples 2–16, Comparative Examples 1–3

Films were obtained by film production in substantially the same manner as in Example 1, except that the polyester production method, the film production method and the like were changed. The results are shown in Tables 1–4.

Example 2

After completion of esterification reaction using ethylene glycol and terephthalic acid as materials, and an antimony catalyst and phosphoric acid as a heat stabilizing agent, an ethylene glycol slurry containing aluminum silicate particles (volume average particle diameter of 0.2 $\mu$m, $S_{10}$ of 20 kgf/mm$^2$, specific surface area of 25 mm$^2$/g) was added, and residual ethylene glycol was discharged to the outside of the system. Subsequently, condensation polymerization was performed, thereby producing chips (A) of polyethylene terephthalate containing a predetermined amount of the particles (intrinsic viscosity of 0.68, 1.2% wt. % of diethylene glycol, melting point of 252° C., 35 equivalence/ton of carboxyl terminal groups, $\Delta Tcg=71°$ C.).

After completion of transesterification using ethylene glycol and dimethyl naphthalene-2,6-dicarboxylate as materials, and an antimony catalyst and phosphoric acid as a heat stabilizing agent, condensation polymerization was performed, thereby producing chips (B) of polyethylene naphthalate (intrinsic viscosity of 0.68, 1.2% wt. % of diethylene glycol, melting point of 267° C., 36 equivalence/ton of carboxyl terminal groups, $\Delta Tcg=99.50°$ C.).

The chips (A) and the chips (B) were mixed at a ratio of 9:1 by weight. The mixture was vacuum-dried at 150° C. for 4 hours and then supplied to a single screw extruder. After being melted and extruded from an ordinary nozzle under the conditions of 290° C. and an average dwell time of 30 minutes, the extrusion was cooled and solidified on a mirror surface cooling drum while electrostatically charged, thereby obtaining an unstretched film. The unstretched film was stretched at 115° C. to 2.9 times lengthwise and, after being cooled to 30° C., stretched at 120° C. to 2.8 times widthwise, and then relaxed by 3% at 190° C. and heat-treated for 5 seconds. The resultant film properties and can properties were as shown in Table 1. The number of crystal melting peaks was one, and excellent formability, scrape resistance, impact resistance and taste property were obtained.

Example 3

The film production was performed in substantially the same manner as in Example 2, except that the melt temperature was 275° C. and the average dwell time was 5 minutes. The resultant film properties and can properties were as shown in Table 1. The number of crystal melting peaks was two, and the formability, impact resistance and taste property slightly decreased.

Example 4

The film production was performed in substantially the same manner as in Example 1, except that the longitudinal stretching temperature was 100° C., the lateral stretching temperature was 110° C., and the longitudinal and lateral stretch ratio was 3 times. The resultant film properties and can properties were as shown in Table 2. The refractive index in the direction of thickness slightly decreased, and the formability and impact resistance slightly decreased.

Example 5

The film production was performed in substantially the same manner as in Example 1, except that polyethylene terephthalate copolymerized with 5 wt. % naphthalene dicarboxylic acid containing a predetermined amount of aluminum silicate particles (volume average particle diameter of 0.2 $\mu$m, $S_{10}$ of 20 kgf/mm$^2$, specific surface area of 25 mm$^2$/g) (intrinsic viscosity of 0.70, 1.3% wt. % of diethylene glycol, melting point of 246° C., 30 equivalence/ton of carboxyl terminal groups, $\Delta Tcg=71°$ C.) was used, and that the longitudinal stretching temperature was 120° C., the lateral stretching temperature was 120° C., and the heat treatment temperature was 200° C. The resultant film properties and can properties were as shown in Table 2. The relaxation time particularly increased, and the formability and impact resistance were particularly good.

Example 6

The film production was performed in substantially the same manner as in Example 5, except that the longitudinal stretching temperature was 100° C., the lateral stretching temperature was 110° C., the longitudinal and lateral stretch ratio was 2.7 times, the heat treatment temperature was 228° C., and the treatment time was 8 seconds. The resultant film properties and can properties were as shown in Table 2. The DSC peak other than the crystal melting peak corresponding to the melting point of the material was as high as 224° C., and the formability after the heat treatment slightly decreased.

Example 7

The film production was performed in substantially the same manner as in Example 6, except that the polyester had carboxyl terminal groups of 42 equivalence/ton. The resultant film properties and can properties were as shown in Table 3. The film had slightly increased carboxyl terminal groups of 47 equivalence/ton, so that the taste property slightly decreased.

Example 8

The film production was performed in substantially the same manner as in Example 1, except that calcium carbonate particles having a particle diameter ratio of 1.33 were used. The resultant film properties and can properties were as shown in Table 3. The formability and impact resistance slightly decreased.

Example 9

The film production was performed in substantially the same manner as in Example 1, except that silica particles having a relative standard deviation of 0.51 were used. The resultant film properties and can properties were as shown in Table 3. The formability and impact resistance slightly decreased.

Example 10

The film production was performed in substantially the same manner as in Example 1, except that alumina particles having metallic carboxylate salt of $0.1\times10^{-5}$ mol/g, a Mohs hardness of 9 and a relative standard deviation of 0.35 were used. The resultant film properties and can properties were as shown in Table 4. The formability, scrape resistance and impact resistance slightly decreased.

Example 11

The film production was performed in substantially the same manner as in Example 1, except that the particle composition was changed. The resultant film properties and can properties were as shown in Table 4. The formability and scrape resistance slightly decreased.

Example 12

The film production was performed in substantially the same manner as in Example 1, except that the particle diameter and specific surface area were changed, and a polyethylene terephthalate obtained by copolymerizing isophthalic acid and naphthalene dicarboxylate component. The resultant film properties and can properties were as shown in Table 4. Since a isophthalic acid component was contained, the taste property slightly decreased.

Example 13

The film production was performed in substantially the same manner as in Example 1, except that organic particles were used. The resultant film properties and can properties were as shown in Table 5. The scrape resistance particularly improved.

Example 14

The film production was performed in substantially the same manner as in Example 1, except that a polyester substantially the same as in Example 1 but containing, as an anti-oxidizing agent, 0.02% by weight of anti-oxidizing agent IRGANOX 1010 by Nippon CIBA-GEIGY (Kabushiki Gaisha) (pentaerythrityl-tetrakis[3-(3,5-di-t-butyl-4-hydroxyphenyl)propionate]) and a polyester as in Example 1 containing no anti-oxidizing agent were laminated at a lamination ratio of 1:2. The resultant film properties and can properties were as shown in Table 5. The taste property particularly improved.

Example 15

The film production was performed in substantially the same manner as in Example 1, except that the tenter method simultaneous biaxial stretching was performed at 110° C. and a ratio of 2.7. The resultant film properties and can properties were as shown in Table 5. The thickness irregularity particularly improved, and the formability, scrape resistance and impact resistance were good.

Comparative Example 1

A polyethylene terephthalate (melting point of 235° C.) copolymerized with diethylene glycol containing a predetermined amount of dry silica was used. The film was stretched at 98° C. to 2.9 times lengthwise and, after being cooled to 30° C., stretched at 105° C. to 2.8 times widthwise, and then relaxed by 3% at 190° C. and heat-treated for 5 seconds. The resultant film properties and can properties were as shown in Table 6. The formability, scrape resistance, impact resistance and taste property considerably deteriorated.

Comparative Example 2

A film was produced as in Example 5, but by stretching the film at 98° C. to 3.3 times lengthwise and, after cooling it to 30° C., stretching it at 105° C. to 3.3 times widthwise, then relaxing it at 200° C. by 3%, and heat-treating it for 5 seconds. The resultant film properties and can properties were as shown in Table 6. The formability, scrape resistance, impact resistance and taste property considerably deteriorated.

Comparative Example 3

A film was obtained in substantially the same manner as in Example 1, except that a polyethylene terephthalate copolymerized with 12 wt. % isophthalic acid containing calcium carbonate particles having a particle diameter ratio of 1.33 was used as a polyester, and the film was stretched at 100° C. to 2.8 times lengthwise and, after being cooled to 30° C., stretched at 110° C. to 2.8 times widthwise, and then relaxed by 3% at 180° C. and heat-treated for 5 seconds. The resultant film properties and can properties were as shown in Table 6. The formability, scrape resistance, impact resistance and taste property considerably deteriorated.

The abbreviations in the tables mean as follows:

PET: polyethylene terephthalate

PET/N: polyethylene terephthalate copolymerized with naphthalene dicarboxylic acid (numerals indicating copolymerization mol %)

PET/I: polyethylene terephthalate copolymerized with isophthalic acid (numerals indicating copolymerization mol %)

PET/DEG: polyethylene terephthalate copolymerized with diethylene glycol (numerals indicating copolymerization mol %)

TABLE 1

| | Polyester | | |
|---|---|---|---|
| | Example 1 | Example 2 | Example 3 |
| Ethylene terephthalate unit (wt. %) | 88 | 90 | 90 |
| Ethylene naphthalate unit (wt. %) | 12 | 10 | 10 |
| Particle kind | Aluminum silicate | Aluminum silicate | Aluminum silicate |
| Dw ($\mu$m) | 0.2 | 0.2 | 0.2 |
| Relative standard deviation | 0.10 | 0.10 | 0.10 |
| Amount added (wt. %) | 0.3 | 0.3 | 0.3 |
| Length/breadth ratio | 1.01 | 1.01 | 1.01 |
| Mohs hardness | 5 | 5 | 5 |
| Amount of metallic carboxylate ($10^{-5}$ mol/g) | 40 | 40 | 40 |
| Article composition | | | |
| Al (mol/100 g) | 1.08 | 1.08 | 1.08 |
| Si (mol/100 g) | 0.31 | 0.31 | 0.31 |
| M (mol/100 g) | 0.34 | 0.34 | 0.34 |
| Crystal state | Amorphous | Amorphous | Amorphous |
| Specific surface area (m$^2$/g) | 25 | 25 | 25 |
| 3.5/Dw | 17.5 | 17.5 | 17.5 |
| Particle strength (kgf/mm$^2$) | 20 | 20 | 20 |
| Number of crystal melting peaks | 1 | 1 | 2 |
| DEG (wt. %) | 1.5 | 1.2 | 1.2 |
| Intrinsic viscosity | 0.70 | 0.68 | 0.68 |
| Thermal crystallization parameter (° C.) | 102 | 93 | — |
| Melting point (° C.) | 230 | 235 | 253,268 |
| Film/Can Property (%) | | | |
| Thickness ($\mu$m) | 25 | 20 | 20 |
| Thickness irregularity | 12 | 13 | 19 |
| Refractive index in the direction of width | 1.525 | 1.527 | 1.513 |
| Surface roughness ($\mu$m) Ra | 0.012 | 0.013 | 0.015 |
| Rt | 0.138 | 0.145 | 0.172 |
| NMR relaxation time (msec) | 370 | 320 | 280 |
| Carboxyl terminal group (equivalence/ton) | 34 | 40 | 38 |
| DSC peak (° C.) | 185 | 185 | 185 |
| Formability | A | A | B |
| Formability | A | A | B |
| Scrape resistance | A | A | A |
| Impact resistance | A | A | B |
| Taste property | A | A | B |

Note) In the table, values of wt. % of ethylene terephthalate unit and ethylenenaphthalate unit were calculated in the form where diethylene glycol components were added.

TABLE 2

| | Example 4 | Example 5 | Example 6 |
|---|---|---|---|
| Polyester | | | |
| Ethylene terephthalate unit (wt. %) | 88 | 95 | 90 |
| Ethylene naphthalate unit (wt. %) | 12 | 5 | 5 |
| Particle kind | Aluminum silicate | Aluminum silicate | Aluminum silicate |
| Dw ($\mu$m) | 0.2 | 0.2 | 0.2 |
| Relative standard deviation | 0.10 | 0.10 | 0.10 |
| Amount added (wt. %) | 0.3 | 0.3 | 0.3 |
| Length/breadth ratio | 1.01 | 1.01 | 1.01 |
| Mohs hardness | 5 | 5 | 5 |
| Amount of metallic carboxylate ($10^{-5}$ mol/g) | 40 | 40 | 40 |
| Article composition | | | |
| Al (mol/100 g) | 1.08 | 1.08 | 1.08 |
| Si (mol/100 g) | 0.31 | 0.31 | 0.31 |
| M (mol/100 g) | 0.34 | 0.34 | 0.34 |
| Crystal state | Amorphous | Amorphous | Amorphous |
| Specific surface area (m$^2$/g) | 25 | 25 | 25 |
| 3.5/Dw | 17.5 | 17.5 | 17.5 |
| Particle strength (kgf/mm$^2$) | 20 | 20 | 20 |
| Number of crystal melting peaks | 1 | 1 | 1 |
| DEG (wt. %) | 1.5 | 1.3 | 1.3 |
| Intrinsic viscosity | 0.70 | 0.70 | 0.70 |
| Thermal crystallization parameter (° C.) | 102 | 71 | 71 |
| Melting point (° C.) | 230 | 246 | 246 |
| Film/Can Property | | | |
| Thickness ($\mu$m) | 25 | 25 | 20 |
| Thickness irregularity (%) | 7 | 15 | 13 |
| Refractive index in the direction of width | 1.508 | 1.525 | 1.511 |
| Surface roughness ($\mu$m) Ra | 0.014 | 0.012 | 0.015 |
| Rt | 0.177 | 0.139 | 0.177 |
| NMR relaxation time (msec) | 290 | 400 | 230 |
| Carboxyl terminal group (equivalence/ton) | 34 | 34 | 34 |
| DSC peak (° C.) | 185 | 197 | 224 |
| Formability a | B | A | A |
| b | B | A | B |
| Scrape resistance | A | A | A |
| Impact resistance | B | A | A |
| Taste property | A | A | A |

Note) In the table, values of wt. % of ethylene terephthalate unit and ethylenenaphthalate unit were calculated in the form where diethylene glycol components were added.

TABLE 3

| | Example 7 | Example 8 | Example 9 |
|---|---|---|---|
| Polyester | | | |
| Ethylene terephthalate unit (wt. %) | 95 | 88 | 88 |
| Ethylene naphthalate unit (wt. %) | 5 | 12 | 12 |
| Particle kind | Aluminum silicate | Calcium carbonate | Silica |
| Dw ($\mu$m) | 0.2 | 0.3 | 0.2 |
| Relative standard deviation | 0.10 | 0.25 | 0.51 |
| Amount added (wt. %) | 0.3 | 0.25 | 0.3 |
| Length/breadth ratio | 1.01 | 1.33 | 1.22 |
| Mohs hardness | 5 | 5 | 6 |
| Amount of metallic carboxylate ($10^{-5}$ mol/g) | 40 | 2 | 0.1 |
| Article composition | | | |
| Al (mol/100 g) | 1.08 | — | — |
| Si (mol/100 g) | 0.31 | — | — |
| M (mol/100 g) | 0.34 | — | — |
| Crystal state | Amorphous | — | Amorphous |
| Specific surface area (m$^2$/g) | 25 | 10 | 9 |
| 3.5/Dw | 17.5 | 11.7 | 17.5 |
| Particle strength (kgf/mm$^2$) | 20 | 21 | 35 |
| Number of crystal melting peaks | 1 | 1 | 1 |
| DEG (wt. %) | 1.3 | 1.5 | 1.5 |
| Intrinsic viscosity | 0.70 | 0.70 | 0.70 |
| Thermal crystallization parameter (° C.) | 71 | 99 | 102 |
| Melting point (° C.) | 246 | 230 | 230 |

TABLE 3-continued

| | Polyester | | |
|---|---|---|---|
| | Example 7 | Example 8 | Example 9 |
| Film/Can Property | | | |
| Thickness ($\mu$m) | 20 | 25 | 25 |
| Thickness irregularity (%) | 13 | 13 | 13 |
| Refractive index in the direction of width | 1.513 | 1.525 | 1.525 |
| Surface roughness ($\mu$m) Ra | 0.015 | 0.014 | 0.017 |
| Rt | 0.173 | 0.199 | 0.222 |
| NMR relaxation time (msec) | 280 | 385 | 305 |
| Carboxyl terminal group (equivalence/ton) | 47 | 37 | 37 |
| DSC peak (° C.) | 224 | 185 | 185 |
| Formability a | A | B | B |
| b | B | B | B |
| Scrape resistance | A | A | A |
| Impact resistance | A | B | B |
| Taste property | B | A | A |

Note) In the table, values of wt. % of ethylene terephthalate unit and ethylenenaphthalate unit were calculated in the form where diethylene glycol components were added.

TABLE 4

| | Polyester | | |
|---|---|---|---|
| | Example 10 | Example 11 | Example 12 |
| Ethylene terephthalate unit (wt. %) | 88 | 88 | 88 |
| Ethylene naphthalate unit (wt. %) | 12 | 12 | 6 |
| Particle kind | -type alumina | Aluminum silicate | Aluminum silicate |
| Dw ($\mu$m) | 0.8 | 0.2 | 0.6 |
| Relative standard deviation | 0.35 | 0.10 | 0.10 |
| Amount added (wt. %) | 0.25 | 0.3 | 0.2 |
| Length/breadth ratio | 1.18 | 1.01 | 1.01 |
| Mohs hardness | 9 | 5 | 5 |
| Amount of metallic carboxylate ($10^{-5}$ mol/g) | 0.1 | 40 | 40 |
| Article composition | | | |
| Al (mol/100 g) | — | 0.8 | 1.08 |
| Si (mol/100 g) | — | 0.31 | 0.31 |
| M (mol/100 g) | — | 1.6 | 0.34 |
| Crystal state | — | Amorphous | Amorphous |
| Specific surface area (m$^2$/g) | 10 | 25 | 4 |
| 3.5/Dw | 4.4 | 17.5 | 5.8 |
| Particle strength (kgf/mm$^2$) | 56 | 20 | 20 |
| Number of crystal melting peaks | 1 | 1 | 1 |
| DEG (wt. %) | 1.5 | 1.5 | 1.5 |
| Intrinsic viscosity | 0.70 | 0.70 | 0.70 |
| Thermal crystallization parameter (° C.) | 100 | 102 | 89 |
| Melting point (° C.) | 230 | 230 | 228 |
| Film/Can Property | | | |
| Thickness ($\mu$m) | 25 | 25 | 25 |
| Thickness irregularity (%) | 14 | 12 | 18 |
| Refractive index in the direction of width | 1.523 | 1.525 | 1.519 |
| Surface roughness ($\mu$m) Ra | 0.020 | 0.017 | 0.017 |
| Rt | 0.286 | 0.258 | 0.255 |
| NMR relaxation time (msec) | 340 | 350 | 370 |
| Carboxyl terminal group (equivalence/ton) | 39 | 36 | 40 |
| DSC peak (° C.) | 185 | 185 | 185 |
| Formability a | B | A | A |
| b | B | B | B |
| Scrape resistance | B | B | A |
| Impact resistance | B | A | B |
| Taste property | A | B | B |

Note) In the table, values of wt. % of ethylene terephthalate unit and ethylenenaphthalate unit were calculated in the form where diethylene glycol components were added.

TABLE 5

| | Polyester | | |
|---|---|---|---|
| | Example 13 | Example 14 | Example 15 |
| Ethylene terephthalate unit (wt. %) | 88 | 88 | 88 |
| Ethylene naphthalate unit (wt. %) | 12 | 12 | 16 |
| Particle kind | Divinyl-benzene | Aluminum silicate | Aluminum silicate |
| Dw ($\mu$m) | 0.6 | 0.2 | 0.2 |
| Relative standard deviation | 0.11 | 0.10 | 0.10 |
| Amount added (wt. %) | 0.15 | 0.3 | 0.3 |
| Length/breadth ratio | 1.00 | 1.01 | 1.01 |
| Mohs hardness | — | 5 | 5 |
| Amount of metallic carboxylate ($10^{-5}$ mol/g) | 10 | 40 | 40 |
| Article composition | | | |
| Al (mol/100 g) | — | 1.08 | 1.08 |
| Si (mol/100 g) | — | 0.31 | 0.31 |
| M (mol/100 g) | — | 0.34 | 0.34 |
| Crystal state | — | Amorphous | Amorphous |
| Specific surface area ($m^2$/g) | — | 25 | 25 |
| 3.5/Dw | — | 17.5 | 17.5 |
| Particle strength (kgf/$mm^2$) | 9 | 20 | 20 |
| Number of crystal melting peaks | 1 | 1 | 1 |
| DEG (wt. %) | 1.5 | 1.5 | 1.5 |
| Intrinsic viscosity | 0.70 | 0.70 | 0.70 |
| Thermal crystallization parameter (° C.) | 102 | 102 | 102 |
| Melting point (° C.) | 230 | 230 | 230 |
| Film/Can Property | | | |
| Thickness ($\mu$m) | 25 | 25 | 25 |
| Thickness irregularity (%) | 14 | 12 | 7 |
| Refractive index in the direction of width | 1.523 | 1.525 | 1.522 |
| Surface roughness ($\mu$m) Ra | 0.013 | 0.013 | 0.010 |
| Rt | 0.186 | 0.142 | 0.155 |
| NMR relaxation time (msec) | 370 | 370 | 390 |
| Carboxyl terminal group (equivalence/ton) | 39 | 34 | 35 |
| DSC peak (° C.) | 185 | 185 | 185 |
| Formability a | A | A | A |
| b | A | A | A |
| Scrape resistance | A | A | A |
| Impact resistance | A | A | A |
| Taste property | A | A | A |

Note) In the table, values of wt. % of ethylene terephthalate unit and ethylenenaphthalate unit were calculated in the form where diethylene glycol components were added

TABLE 6

| | Polyester | | |
|---|---|---|---|
| | Comparative Example 1 | Comparative Example 2 | Comparative Example 3 |
| Ethylene terephthalate unit (wt. %) | 100 | 95 | 88 |
| Ethylene naphthalate unit (wt. %) | — | 5 | |
| Particle kind | Dry silica | Aluminum silicate | Calcium carbonate |
| Dw ($\mu$m) | 0.8 | 0.2 | 0.3 |
| Relative standard deviation | 0.42 | 0.10 | 0.25 |
| Amount added (wt. %) | 0.2 | 0.3 | 0.25 |
| Length/breadth ratio | 1.8 | 1.01 | 1.33 |
| Mohs hardness | 6 | 5 | 5 |
| Amount of metallic carboxylate ($10^{-5}$ mol/g) | — | 40 | 2 |
| Article composition | | | |
| Al (mol/100 g) | — | 1.08 | — |
| Si (mol/100 g) | — | 0.31 | — |
| M (mol/100 g) | — | 0.34 | — |
| Crystal state | — | Amorphous | — |
| Specific surface area ($m^2$/g) | — | 25 | 10 |
| 3.5/Dw | — | 17.5 | 11.7 |
| Particle strength (kgf/$mm^2$) | 4 | 20 | 21 |
| Number of crystal melting peaks | 1 | 1 | 1 |
| DEG (wt. %) | 10 | 1.3 | 1.5 |
| Intrinsic viscosity | 0.63 | 0.70 | 0.70 |
| Melting point (° C.) | 235 | 246 | 229 |

TABLE 6-continued

| | Polyester | | |
|---|---|---|---|
| | Comparative Example 1 | Comparative Example 2 | Comparative Example 3 |
| Film/Can Property | | | |
| Thickness (μm) | 25 | 25 | 25 |
| Thickness irregularity (%) | 10 | 5 | 13 |
| Refractive index in the direction of width | 1.508 | 1.497 | 1.521 |
| Surface roughness (μm) Ra | 0.017 | 0.013 | 0.010 |
| Rt | 0.286 | 0.145 | 0.155 |
| Carboxyl terminal group (equivalence/ton) | 41 | 34 | 40 |
| DSC peak (° C.) | 185 | 197 | 176 |
| Formability a | B | B | A |
| b | C | C | B |
| Scrape resistance | C | B | B |
| Impact resistance | D | C | C |
| Taste property | C | B | C |

Note) In the table, values of wt. % of ethylene terephthalate unit and ethylenenaphthalate unit were calculated in the form where diethylene glycol components were added

INDUSTRIAL APPLICABILITY

The biaxially stretched polyester film for forming containers of the present invention is not only excellent in the formability during formation into cans or the like, but has excellent properties in taste property, particularly, the taste property after the retorting, and may be suitably used for containers produced by forming process and, particularly, for metallic cans.

We claim:

1. A biaxially stretched polyester film for forming a container, characterized by being formed of a polyester substantially consisting of an ethylene terephthalate unit and an ethylene naphthalate unit, the refractive index in the direction of thickness of the film being 1.5 or greater.

2. A biaxially stretched polyester film for forming a container, according to claim 1, wherein the melting point is 240–300° C., and carboxyl terminal groups are present in 10–50 equivalence/ton.

3. A biaxially stretched polyester film for forming a container, according to claim 2, wherein the melting point is 246–300° C.

4. A biaxially stretched polyester film for forming a container, according to claim 1, wherein the ethylene terephthalate unit is present in 50–99% by weight, and the ethylene naphthalate unit is present in 1–50% by weight, and wherein the refractive index in the direction of thickness of the film is 1.5–1.6.

5. A biaxially stretched polyester film for forming a container, according to any one of claims 1–4, wherein the refractive index in the direction of thickness of the film is 1.52–1.6.

6. A biaxially stretched polyester film for forming a container, according to claim 5, wherein the relaxation time of a carbonyl portion by structure analysis by solid high resolution NMR is 270 msec or longer.

7. A biaxially stretched polyester film for forming a container, according to claim 6, characterized in that a DSC peak is present at 220° C. or lower.

8. A biaxially stretched polyester film for forming a container, according to claim 7, characterized by containing 0.005–10% by weight of particles wherein the volume average particle diameter is 0.005–5 μm and the relative standard deviation σ expressed by the expression below is 0.5 or less:

$$\sigma = (\Sigma(Di-D)^2/n)^{1/2}/D$$

$$D = \Sigma Di/n$$

where

σ: relative standard deviation

D: number average particle diameter (μm)

Di: particle diameter (μm)

n: number of particles (number).

9. A biaxially stretched polyester film for forming a container, according to claim 8, containing 0.01–5% by weight of particles wherein the volume average particle diameter is 0.01–5.0 μm and the relative standard deviation is 0.3 or less.

10. A biaxially stretched polyester film for forming a container, according to claim 9, wherein the length/breadth ratio of the particles is 1.0–1.2, and the Mohs hardness thereof is less than 7.

11. A biaxially stretched polyester film for forming a container, according to claim 10, characterized in that a metallic carboxylate salt is present on surfaces of the particles in an amount of $10^{-5}$ mol or more relative to 1 g of the particles.

12. A biaxially stretched polyester film for forming a container, according to claim 10, characterized in that the particles are aluminum silicate particles having the following composition:

$$0.9 \leq Si \leq 1.5$$
$$0.1 \leq Al \leq 0.8$$
$$0.1 \leq M \leq 0.8$$
$$0.8 \leq M/Al \leq 1.5$$

where

Si: number of moles of silicon atoms in 100 g of the particles,

Al: number of moles of aluminum atoms in 100 g of the particles,

M: number of moles of alkaline metal atoms in 100 g of the particles.

13. A biaxially stretched polyester film for forming a container, according to claim 12, wherein the aluminum silicate particles are substantially amorphous.

14. A biaxially stretched polyester film for forming a container, according to claim 13, characterized in that the volume average particle diameter Dw (μm) and the specific surface area S (m²/g) of the aluminum silicate particles satisfy the relationship of S≧3.5/Dw.

15. A biaxially stretched polyester film for forming a container, according to claim 14, characterized in that the strength ($S_{10}$) at 10% deformation of the aluminum silicate particles satisfies the relationship of:

$$5 \text{ kgf/mm}^2 \leq S_{10} \leq 40 \text{ kgf/mm}^2.$$

16. A biaxially stretched polyester film for forming a container, according to claim 15, wherein the particles are organic macromolecular particles.

17. A biaxially stretched polyester film for forming a container, according to claim 16, wherein the strength ($S_{10}$) at 10% deformation of the organic macromolecular particles satisfies the relationship of:

$$0.5 \text{ kgf/mm}^2 \leq S_{10} \leq 15 \text{ kgf/mm}^2.$$

18. A biaxially stretched polyester film for forming a container, according to claim 17, characterized by containing 0.0001–1% by weight of an anti-oxidizing agent.

19. A biaxially stretched polyester film for forming a container, according to claim 1, characterized in that the film is formed after being thermally laminated on a metallic sheet.

20. A method of producing a biaxially stretched polyester film for forming a container defined in claim 1, characterized by separately producing polyethylene terephthalate and polyethylene naphthalate, and then kneading them to obtain a mixture of polyethylene terephthalate and polyethylene naphthalate, and producing a film from the mixture.

21. A method of producing a biaxially stretched polyester film for forming a container, according to claim 20, characterized in that the number of crystal melting peaks of the mixture is one.

* * * * *

UNITED STATES PATENT AND TRADEMARK OFFICE
CERTIFICATE OF CORRECTION

PATENT NO. : 5,948,525
DATED : September 7, 1999
INVENTOR(S) : Kimura et al

It is certified that error appears in the above-identified patent and that said Letters Patent is hereby corrected as shown below:

In Column 21, at Table 3, at "Example 6", please change "90" to -95-.

Signed and Sealed this

Seventeenth Day of April, 2001

Attest:

NICHOLAS P. GODICI

Attesting Officer        Acting Director of the United States Patent and Trademark Office

UNITED STATES PATENT AND TRADEMARK OFFICE
CERTIFICATE OF CORRECTION

PATENT NO. : 5,948,525
DATED : September 7, 1999
INVENTOR(S) : Kimura et al.

It is certified that error appears in the above-identified patent and that said Letters Patent is hereby corrected as shown below:

Column 21,
Table 2, at "Example 6", please change "90" to -- 95 --.

This certificate supercedes Certificate of Correction issued April 17, 2001.

Signed and Sealed this

Ninth Day of October, 2001

*Attest:*

NICHOLAS P. GODICI
*Attesting Officer*   *Acting Director of the United States Patent and Trademark Office*